United States Patent [19]

Suzuki et al.

[11] Patent Number: 5,178,013
[45] Date of Patent: Jan. 12, 1993

[54] IMPACT SENSOR

[75] Inventors: Otohiko Suzuki, Tokyo; Kouichi Kaneko; Youichi Fujiyama, both of Yokohama, all of Japan

[73] Assignee: Takata Corporation, Tokyo, Japan

[21] Appl. No.: 667,410

[22] PCT Filed: Oct. 4, 1990

[86] PCT No.: PCT/JP90/01281
§ 371 Date: Apr. 8, 1991
§ 102(e) Date: Apr. 8, 1991

[87] PCT Pub. No.: WO91/05266
PCT Pub. Date: Apr. 18, 1991

[30] Foreign Application Priority Data

Oct. 6, 1989 [JP] Japan .................. 1-260090

[51] Int. Cl.$^5$ ............ G01P 15/08; B60R 21/32; H01L 41/04; H01L 41/08
[52] U.S. Cl. ................ 73/517 R; 310/329; 280/735
[58] Field of Search ............ 310/329; 73/517; 280/735; 307/10.1

[56] References Cited

U.S. PATENT DOCUMENTS

| 2,411,401 | 11/1946 | Welch | 310/329 |
| 3,071,975 | 1/1963 | Hurt | 73/517 |
| 3,096,656 | 7/1963 | Jackson | 73/517 |
| 3,120,622 | 2/1964 | Dranetz et al. | 310/329 |
| 3,233,466 | 2/1966 | Shaw | 73/517 |
| 3,349,629 | 10/1967 | Elazar | 310/329 |
| 3,701,903 | 10/1972 | Merhar | 310/329 |
| 4,104,921 | 8/1978 | Nissl | 310/329 |
| 4,950,914 | 8/1990 | Kurihara et al. | 280/735 |

FOREIGN PATENT DOCUMENTS

| 75832/81 | 3/1982 | Australia . | |
| 14656 | 8/1980 | European Pat. Off. . | |
| 21898 | 1/1981 | European Pat. Off. . | |
| 59793 | 9/1982 | European Pat. Off. . | |
| 116810 | 8/1984 | European Pat. Off. . | |
| 171848 | 2/1986 | European Pat. Off. . | |
| 210715 | 2/1987 | European Pat. Off. . | |
| 316498 | 5/1989 | European Pat. Off. . | |
| 737838 | 7/1975 | U.S.S.R. | 310/329 |
| WO82/02602 | 8/1982 | World Int. Prop. O. . | |

Primary Examiner—Hezron E. Williams
Assistant Examiner—George M. Dombroske
Attorney, Agent, or Firm—Kanesaka and Takeuchi

[57] ABSTRACT

The present invention provides an impact sensor which has neither electrical contacts exposed to an atmosphere nor any movable components, which is durable and highly reliable, and which is able to safely sense a vehicle impact even if loaded in a vehicle for a considerable period of time. The impact sensor comprises a piezoelectric element (3, 13) for generating a voltage of a magnitude in accordance with a pressure, a pair of electrodes (1c, 1d, 11c, 14) disposed to sandwich the piezoelectric element, an inertial mass (6,16) adapted to apply a pressure to either one of the electrodes, and a biasing member (7, 17) for biasing the inertial mass (6, 16) toward the piezoelectric element (3, 13). When the inertial mass (6, 16) is subject to an impact, the inertial mass (6, 16) is biased to apply to the piezoelectric element (3, 13) a pressure of a level in accordance with the magnitude of the impact. The piezoelectric element (3, 13) then provides a voltage of a magnitude in accordance with the pressure applied thereto.

5 Claims, 5 Drawing Sheets

IMPACT SENSOR

TECHNICAL FIELD

The present invention relates to an impact sensor suitable for use with a vehicle airbag constructed to protect a vehicle occupant from impact in the event of a vehicle collision.

BACKGROUND ART

In order to protect a vehicle occupant from impact, use of a vehicle airbag has recently been increased.

Such an airbag is inflated instantaneously when a vehicle collision is detected, and its operation depends mainly on the performance of an impact sensor.

U.S. Pat. No. 4,827,091 discloses an acceleration sensor designed to detect a substantial change in the speed of a motor vehicle in the event, for instance, of a vehicle collision and comprises a cylindrical body formed of an electrically conductive material, a magnetic inertial mass mounted for axial movement within the cylindrical body, an electrically conductive element attached to at least one axial end of the magnetic inertial mass, a pair of electrical terminals mounted to one axial end of the cylindrical body and electrically bridged upon contact with the electrically conductive element of the magnetic inertial mass, and a magnetic biasing body mounted to the other end of the cylindrical body and adapted to magnetically bias the magnetic inertial mass.

With this acceleration sensor, the magnetic inertial mass is magnetically biased toward the magnetic biasing body. When the acceleration sensor is subject to no or little accelerating force, the magnetic inertial mass is fixed in place at the other end of the cylindrical body.

When the acceleration of sufficient magnitude is applied, the magnetic inertial mass is displaced against the biasing force of the magnetic biasing body. At this time, an electric current is induced in the cylindrical body to provide a magnetic force to return the magnetic inertial mass or to retard the displacement of the magnetic inertial mass. This results in a descease in the speed of the magnetic inertial mass.

When the acceleration input is less than a predetermined (threshold) level, the magnetic inertial mass does not reach the one end of the cylindrical body and then returned to the other end of the cylindrical body from any other position short of the one end of the cylindrical body by a biasing force of the magnetic biasing body.

When the acceleration input is greater than a predetermined (threshold) level (for example, a vehicle incorporating this acceleration sensor is crashed), the magnetic inertial mass reaches the one end of the cylindrical body. The electrically conductive element or end surface of the magnetic inertial mass is then brought into contact with the both terminals to electrically bridge the two terminals. If a voltage has previously been applied between the two terminals, an electric current flows between the terminals when the two terminals are short-circuited. This electric current shows a vehicle collision.

In the sensor of U.S. Pat. No. 4,827,091, the magnetic inertial mass is advanced to a full extent so as to contact a pair of electrodes. This electrically bridges the two electrodes. In order for the sensor to properly operate for a prolonged period of time, the inner suface of the cylindrical body within which the magnetic inertial mass is slidably moved must be totally flat and free of friction and corrosion. Additionally, the ends of the electrodes and the magnetic inertial mass must be totally free of rust or corrosion. Therefore, the cylindrical body should be made of a material which provides high resistance to corrosion, and its inner surface should also be finely abraded. This results in a substantial increase in the production cost. Also, the electrodes should be plated with gold so as to fully prevent corrosion. This further increases manufacturing costs.

DISCLOSURE OF THE INVENTION

According to the present invention, there is provided an impact sensor comprising: a piezoelectric element adapted to provide a specific amount of voltage in accordance with a pressure applied thereto; and an inertial mass for applying a pressure to the piezoelectric element, whereby when the inertial mass is subject to an impact, the inertial mass presses the piezoelectric element with a pressure of a level in accordance with the impact, and the piezoelectric element provides a voltage of a magnitude in accordance with the pressure applied therero.

Preferably, the impact sensor of the present invention further includes a pair of electrodes between which the piezoelectric element is sandwiched; the inertial mass being adapted to exert a pressure on either one of the electrodes; and a biasing member disposed to press the inertial mass toward the piezoelectric element.

According to the present invention, the inertial mass is in direct contact with the electrode, or a pressure receiving element is disposed between the electrode and the inertial mass to transmit the pressure from the inertial mass to the electrode.

According to the present invention, it is preferable that the inertial mass has a semispherical end in contact with the electrode or the pressure receiving element.

According to the present invention, it is preferable that the electrode or the pressure receiving element has a recess shaped to diverge gradually toward its top, and the inertial mass has an end surface in contact with the inner surface of the recess.

The recess is, for example, a groove of a V-shaped or cone-shaped section, or has a round surface.

According to another aspect of the present invention, there is provided a means for receiving an output voltage from the piezoelectric element and determining whether the output voltage is greater than a predetermined (threshold) level. A signal is provided to inflate an airbag when the output voltage exceeds the predetermined level.

The inertial mass is, for example, a ball. Also, the inertial mass has a semispherial end and a continuous cylindrical portion. The cylindrical portion includes a recess at its rear end to receive a spring as a biasing member.

According to a further aspect of the present invention, the inertial mass is formed from a magnetic material. An an electromagnetic unit is included to apply a magnetic force to the inertial mass to move the inertial mass away from the piezoelectric element. An electric current is delivered to the electromagnetic unit to move the inertial mass away from the piezoelectric element and then, stopped. The piezoelectric element is operable to provide a voltage upon the delivery and stoppage of the electric current so as to test the operation of the impact sensor.

BEST MODE FOR CARRYING OUT THE INVENTION

Figure 1:
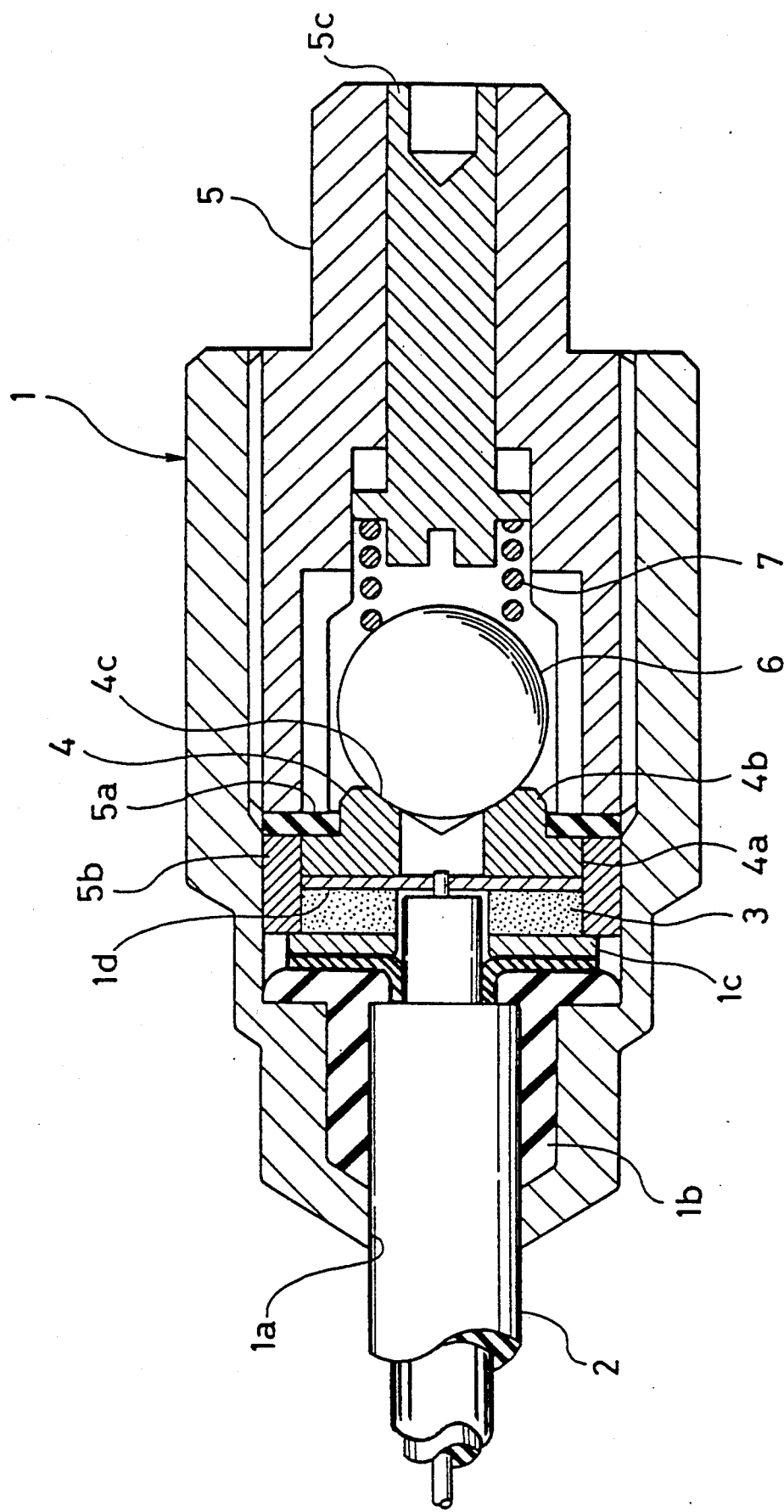
FIG. 1 is a sectional view, in plan, of an impact sensor according to a first embodiment of the invention.
Figure 2:
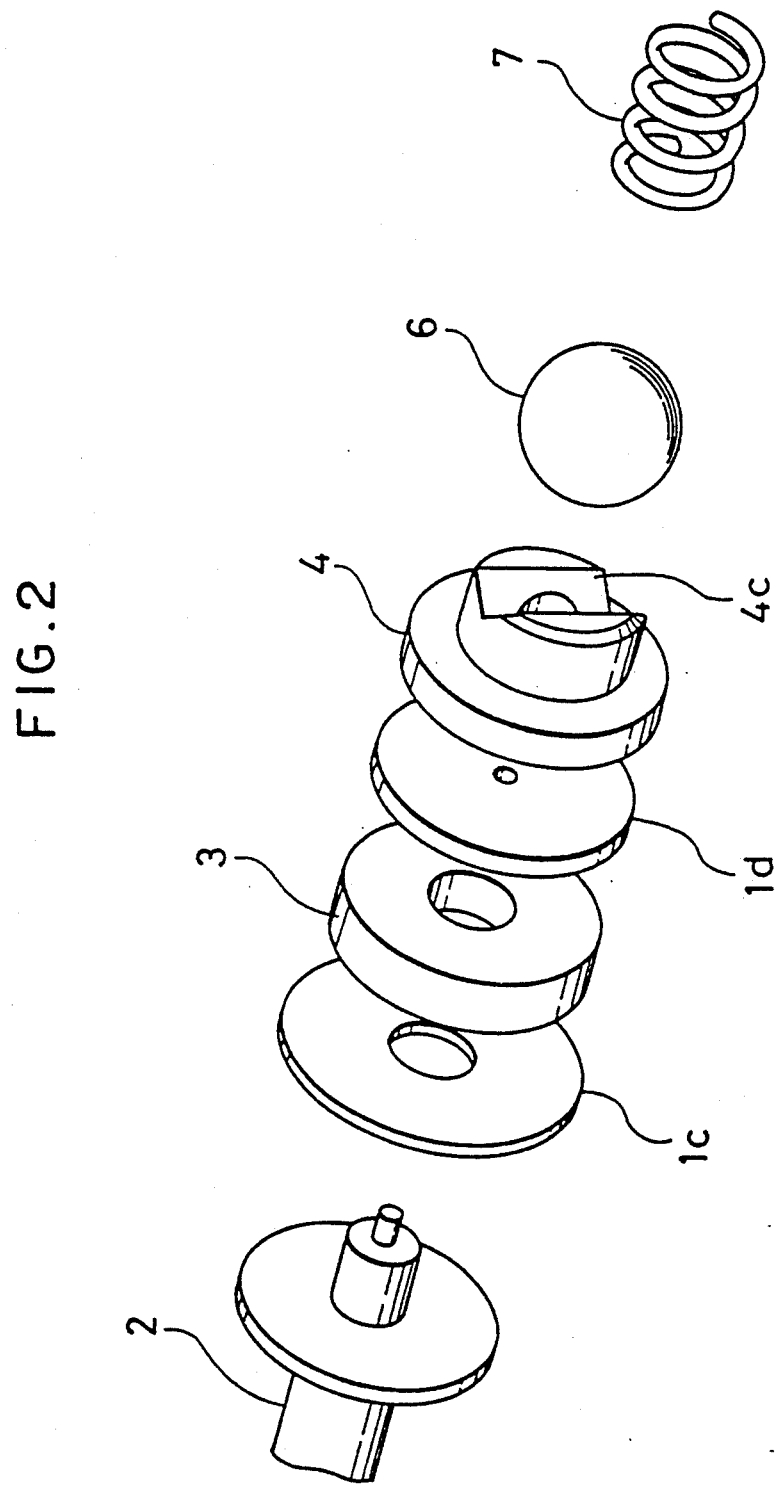
FIG. 2 is a perspective view of major components used in the impact sensor.

FIG. 1 is a sectional view, in plan, of an impact sensor. FIG. 2 is an exploded view of the principal part of the impact sensor.

With reference to FIG. 1, 1 is a cylindrical housing. The housing 1 has an opening 1a through which one end of an output cable 2 extends into the housing 1.

Within the housing 1, a cylindrical electrode holder 1b, a doughnut-shaped cathode plate 1c, a piezoelectric element 3, and an anode plate 1d are fit around the output cable 2 in that order.

The output cable 2 is connected to the cathode plate 1c and the anode 1d, respectively.

The piezoelectric element 3 is constructed to produce a voltage in proportion to an external compressive force and is preferably a known piezoelectric ceramic that provides a constant voltage output.

4 is a pressure receiving element. The pressure receiving element 4 has a large diameter portion 4a, a flat side of which is in contact with the anode plate 1d, and a small diameter portion 4b in which a vertical groove 4c extends in a continuous fashion. The vertical groove 4c has a V-shaped or U-shaped section.

It is particularly important for the vertical groove 4c to extend in a vertical direction and have opposite open ends.

The sensitivity of the impact sensor with respect to lateral impact depends on the angle at which both sides of the vertical groove 4c intersect.

5 is a cap threaded into the housing 1 to close an open end of the housing 1.

5a is a seal member, and 5b is an insulating ring.

The cap 5 is recessed to receive an inertial mass 6 in the form of a ball.

A spring 7 is disposed between the inertial mass 6 and the bottom of the cap 5 to normally urge the inertial mass 6 against the vertical groove 4a. This results in linear contact of the inertial mass 6 with the vertical groove 4c.

The force of the spring 7 can be adjusted by rotating an adjusting bolt 5c. The adjusting bolt 5c is threaded centrally into the cap 5.

The piezoelectric element 3 is subjected to a certain pressure under the influence of the spring 7 to thereby produce a certain voltage.

The impact sensor of the present invention is mounted in such a manner that the pressure receiving element 4 is positioned forwardly of the inertial mass 6 in the direction of advancement of a vehicle.

The pressure receiving element 4 is arranged such that the groove 4c extends in a vertical direction.

Figure 9:
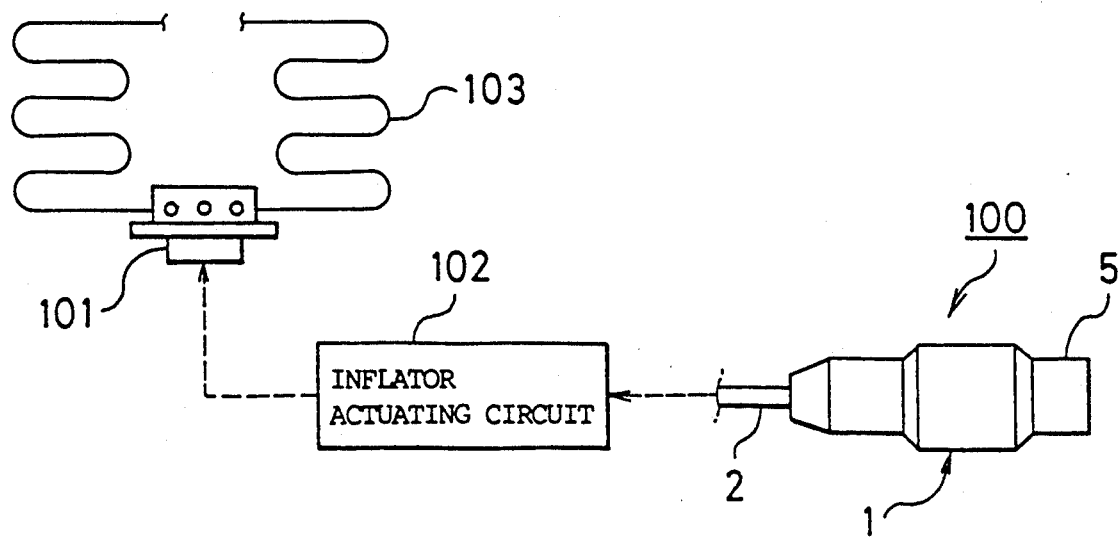
FIG. 9 is a diagram of an airbag system incorporating the impact sensor.

As shown in FIG. 9, the output cable 2 extends from the impact sensor 100 to an inflator actuating circuit 102 which is, in turn, operable to actuate a gas generator (inflator) 101. An electric current is applied to the inflator 101 to rapidly initiate chemical reaction. This results in the generation of a substantial amount of gas. The gas is introduced into an airbag 103 as folded to rapidly inflate the airbag 103.

The inflator actuating circuit 102 compares an output voltage from the piezoelectric element 2 with a predetermined voltage (threshold level) and provides a current to actuate the inflator 101 only when the output volate from the piezoelectric element 3 exceeds a predetermined (threshold) level.

Operation of the impact sensor thus constructed is as follows.

NO COLLISION

In the event of no collision, the static force of the spring 7 is transmitted from the inertial mass 6 through the pressure receiving element 4 and the anode plate 1d to the piezoelectric element 3. No peak voltage is output from the piezoelectric element 3 as such.

The impact sensor is thus rendered irresponsive in the event of no collision.

VERTICAL VIBRATIONS

When a vehicle is subject to vertical vibrations, the impact sensor is correspondingly vibrated in a vertical direction.

This results in sliding motion of the inertial mass 6 and the vertical groove 4c. The piezoelectric element 3 does not provide a voltage higher than a predetermined (threshold) level since the force of the spring 7 to urge the inertial mass 6 against the vertical groove 4c remains substantially unchanged.

The impact sensor is thus irresponsive to vertical vibrations.

HEAD-ON COLLISION AND FRONT-END COLLISION

In the event of a head-on vehicle collision, there is a substantial increase in an acceleration force applied from the inertial mass 6 to the pressure receiving element 3.

The force thus applied to the pressure receiving element 4 is transmitted through the anode plate 1d to the piezoelectric element 3.

Figure 3:
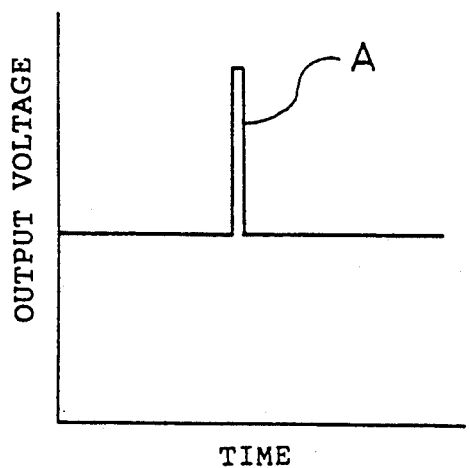
FIG. 3 is a view showing a waveform of an output voltage in the event of a vehicle collision.

As a result, the piezoelectric element 3 provides a peak voltage, as at A in FIG. 3, which is greater than a predetermined (threshold) level. The inflator actuating circuit 102 is then operable to sense this peak voltage so as to actuate the inflator 101. This causes inflation of the airbag.

Also, when a vehicle is hit diagonally from ahead, a component of the acceleration input is applied to the opposite sides of the vertical groove 4c and then, transmitted to the piezoelectric element 3. Likewise, a peak voltage, greater than a predetermined (threshold) level, is output so that the inflator 101 may be actuated to inlfate the airbag 103.

SIDEWAYS COLLISION

In the event of a sideways collision, the inertial mass 6 is caused to move either in an upward direction or a downward direction in FIG. 1. The resulting force creates a component force in the slant surfaces of the vertial groove 4c. This force presses the pressure receiving element 4. As a result, the pressure receiving element 4 is moved to the left in FIG. 1 so as to press the piezoelectric element 3 through the anode plate 1d, as in the case of a head-on collision. Now that this pressing force is small, the output voltage from the piezoelectric element 3 is less than a predetermined (threshold) level. Accordingly, the inflator is not rendered operative by the inflator actuating circuit, and no inflation of the airbag is initiated.

REAR-END COLLISION

In the event of a rear-end collision, impact is applied to the left side of the impact sensor in FIG. 1. This causes the inertial mass, which is contacted with the pressure receiving element 4 under a certain pressure, to separate from the vertical groove 4c.

The piezoelectric element 3 is no longer subject to a force. This results in a substantial decrease in the output voltage from the piezoelectric element 3.

Figure 4:
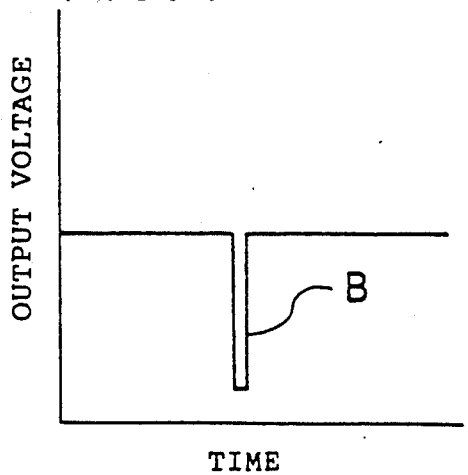
FIG. 4 is a view showing a waveform of an output voltage in the event of a rear-end collision.

A waveform in FIG. 4 shows such a substantial decrease in the output voltage as at B.

Now that no positive peak voltage is supplied, the inflator actuating circuit 102 does not provide an electric current to actuate the inflator 101.

Figure 5:
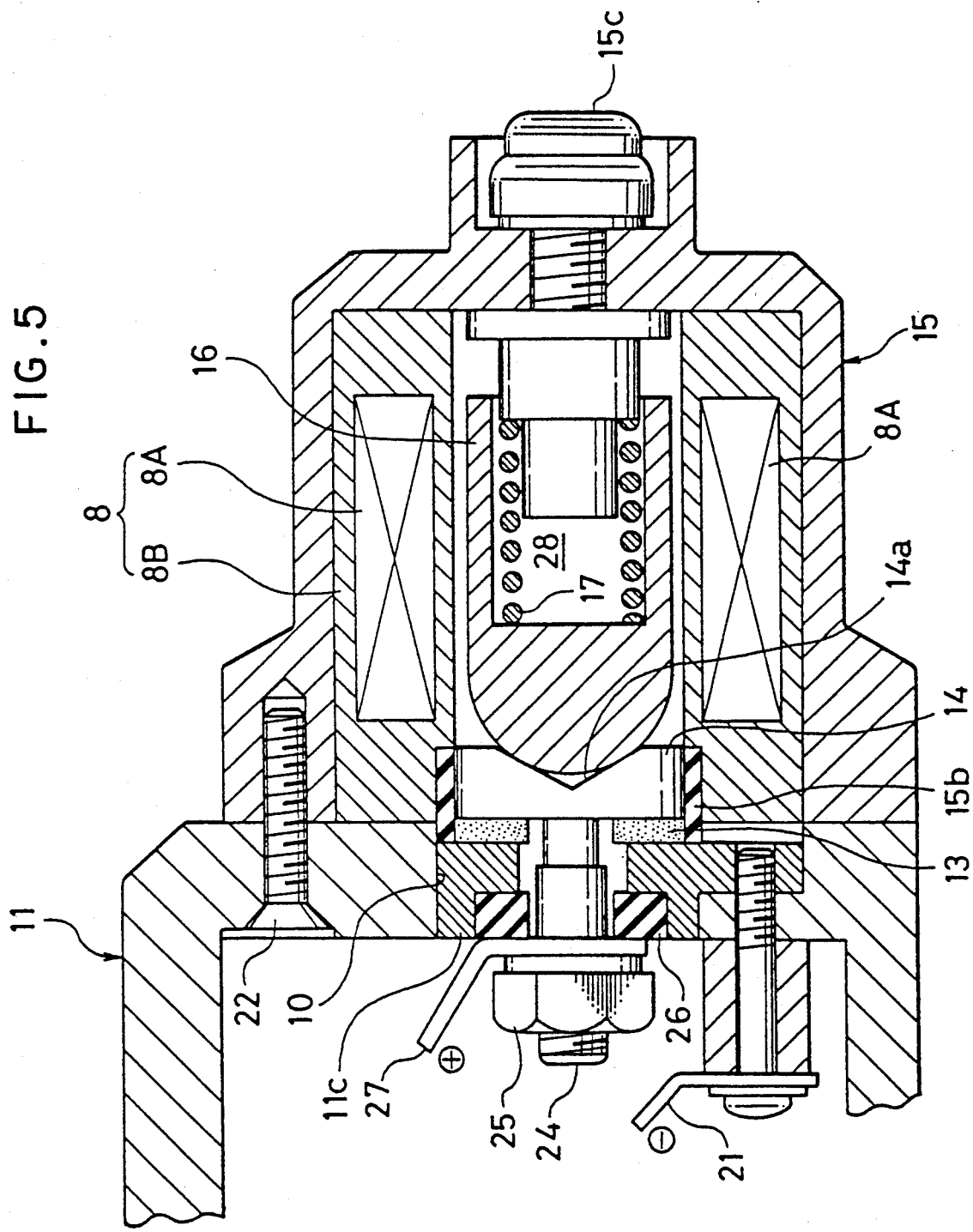
FIG. 5 is a sectional view, in plan, of an impact sensor according to a second embodiment of the invetion.

FIG. 5 illustrates another embodiment of the impact sensor which performs a self-testing function to confirm whether or not the impact sensor is properly operating.

In the embodiment, as shown in FIG. 5, an electromagnetic unit 8 surrounds the inertial mass 6. An electric current is applied from a test circuit to a coil 8A.

In this embodiment, a housing 11 has an opening 10 in which a cathode plate or ring 11c is fit. A conductor or bolt 20 is threaded into the cathode plate 11c. A cathode lead terminal 21 is connected to the head of the bolt 20.

A cap 15 is secured to one end of the housing 11 by screws 22. The electromagnetic unit 8 extends along the inner peripheray of the cap 15 and includes a coil 8A, and a cylindrical core 8B formed of a ferromagnetic material.

The core 8B is disposed in coaxial relation to the opening 10. A pressure receiving element 14 and an inertial mass 16 are disposed in coaxial relation to the core 8B and the opening 10. A piezoelectric element 13 is sandwiched between the pressure receiving element 14 and the cathode plate 11c. An insulating sleeve 15b is fit around the pressure receiving element 14 and the piezoelectric element 13.

The pressure receiving element 14 serves as an anode. A rod 24 is secured to the pressure receiving element 14 and extends, at right angles to the side of the pressure receiving element 14. A nut 25 is threaded onto one end of the rod 24 while an anode lead terminal 27 is held on the cathode plate 11c through an insulating plate 26. The pressure receiving element 14, like the receiving element 4 shown in FIGS. 1 and 2, has a vertically extending groove 14a.

The inertial mass 16 has a semispherical end slidably engageable with the vertical groove 14a of the pressure receiving element 14. The inertial mass 16 is recessed as 28 at the other, rear end to receive a spring 17. An adjusting bolt 15c is threaded into the cap 15. The spring 17 is compressed between the adjusting bolt 15c and the bottom of the recess 28. The semispherical end of the inertial mass 16 is urged against the vertical groove 14a under the action of the spring 17. The piezoelectric element 13 disposed between the pressure receiving element 14 and the cathode plate 11c is subject to a certain compressive force under the influence of the spring 17.

The impact sensor thus constructed is mounted in the same manner as the one shown in FIGS. 1 and 2 and is operable in the same manner to sense impact so as to inflate the airbag.

Additionally, the impact sensor shown in FIG. 5 is able to test its operability itself.

To do this, an electric current is applied from the test circuit to the coil 8A for a short period of time.

Figure 6:
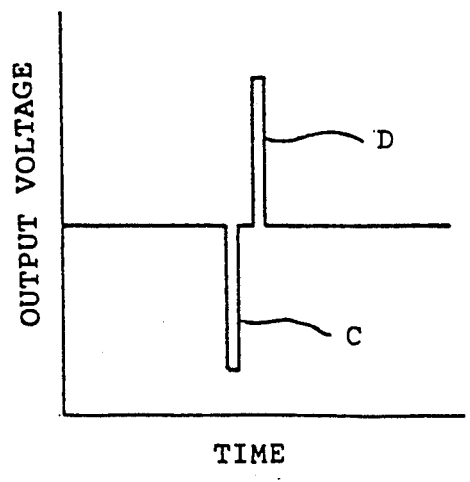
FIG. 6 is a view showing a waveform of an output during testing.

Specifically, an electric current is applied to the coil 8A for a short period of time to generate a magnetic flux. This causes the inertial mass 19 to instantaneously retreat or move to the right in FIG. 5. The piezoelectric element 13 is then operable to provide a voltage of the form shown in FIG. 6.

When the inertial mass 16 is moved in a rearward direction instantaneously upon the delivery of an electric current, a lesser amount of force is applied from the spring 17 to the pressure receiving element 14. As a result, output voltage is drastically dropped as at C in the waveform shown in FIG. 6.

When the delivery of the electric current to the electromagnet 8 is stopped, a substantial amount of force is instantaneously applied to the piezoelectric element 13. As a result, a positive peak voltage is generated as at D in FIG. 6.

It will now be understood that the test circuit is operable to confirm, under the same condition as in the event of a rear-end collision (none collision) as well as a collision, whether a predetermined voltage is output from the piezoelectric element 13.

Based on a signal sent from the test circuit, a lamp or other means may be used to show whether the impact sensor is properly operating.

Figure 7:
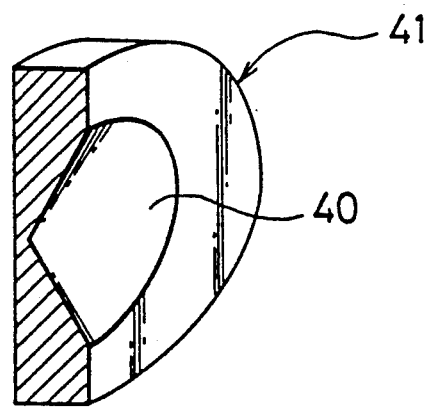
FIG. 7 is a sectional view, in perspective, of an electrode plate or a pressure receiving plate 41.
Figure 8:
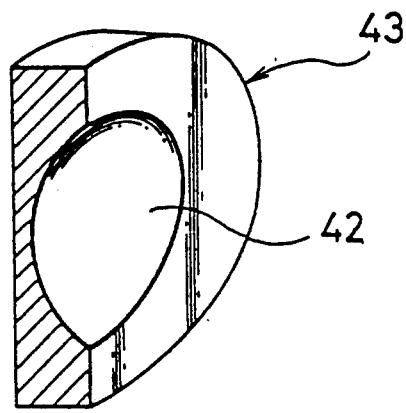
FIG. 8 is a sectional view, in perspective, of an electrode plate or a pressure receiving plate 43.

In the foregoing embodiments, the inertial masses 6 and 16 are both engageable with the grooves 4c and 14c of a V-shaped section. Alternatively, an electrode plate or pressure receiving element 41 may be used to have a cone-shaped recess 40 as shown in FIG. 7. Additionally, an electrode plate or pressure receiving element 43 has a round recess 42 as shown in FIG. 8. The recess 42 may have a spherical surface or a ellipsoidal surface.

INDUSTRIAL APPLICABILITY

With the sensor of the present invention, impact is rapidly transmitted since the inertial mass is normally pressed against the piezoelectric element.

The impact sensor is responsive in a quick manner.

The piezoelectric element provides a high voltage in response only to a pressure. This prevents erroneous operation of the sensor when no collision occurs (or in the event of a rear-end collision).

The impact sensor can readily be tested itself simply by incorporating the electromagnet so as to electrically move the inertial mass, and connecting the output cable with the test circuit.

The impact sensor is simple in structure, and is economical to manufacture.

The impact sensor is less subject to fatigue due to vibrations since no movable components are included and thus can have a high natural frequency as a sensor.

The impact sensor is free of friction and corrosion and never malfunctions. Additionally, the present invention has no electrical terminals exposed to an atomosphere and in no way suffers from inadequate electrical bridge due to corrosion of such electrical terminals. Under the circumstances, the impact sensor of the present invention never loses its characteristics even if it is loaded on a vehicle for a considerable period of time and is thus durable and is highly reliable.

In the present invention, impact is converted into electrical energy as an output.

Accordingly, record or impact data can be taken in a continuous manner.

The operation of the impact sensor can readily be finely adjusted. The impact sensor is advantageously used for experimental and commercial purposes.

We claim:

1. An impact sensor for a vehicle, comprising,
   a casing attached to the vehicle,
   a piezoelectric element situated in the casing and adapted to provide a voltage varied in accordance with a pressure applied thereto,
   a pair of electrodes situated in the casing and sandwiching the piezoelectric element therebetween,
   a pressure receiving element situated on one of the electrodes, said pressure receiving element having a recess with side faces to converge gradually toward the piezoelectric element, said recess being arranged to extend vertically relative to the vehicle throughout an entire length of the pressure receiving element,
   an inertial mass disposed on the recess of the pressure receiving element for applying a pressure to the piezoelectric element through the pressure receiving element, said inertial mass having a semispherical end contacting the pressure receiving element,
   a biasing member situated behind the inertial mass to hold the inertial mass in a center of the recess of the pressure receiving element and to press the inertial mass toward the piezoelectric element at a predetermined pressure so that when the sensor is subject to vertical vibrations, the inertial mass slides vertically in the recess without substantial change of voltage at the piezoelectric element, and when the sensor receives force diagonally from a front direction, a component of the force in a forward direction is received by one of the side faces of the recess and is transmitted to the piezoelectric element, and
   an adjusting bolt attached to the casing for adjusting pressure of the biasing member relative to the piezoelectric element through the inertial mass.

2. An impact sensor for a vehicle, comprising,
   a casing attached to the vehicle,
   a piezoelectric element situated in the casing and adapted to provide a voltage varied in accordance with a pressure applied thereto,
   a pair of electrodes situated in the casing and sandwiching the piezoelectric element therebetween, one of the electrodes forming a pressure receiving element for the piezoelectric element, said pressure receiving element having a recess with side faces to converge gradually toward the piezoelectric element, said recess being arranged to extend vertically relative to the vehicle throughout an entire length of the pressure receiving element,
   an inertial mass disposed on the recess of the pressure receiving element for applying a pressure to the piezoelectric element through the pressure receiving element, said inertial mass having a semispherical end contacting the pressure receiving element,
   a biasing member situated behind the inertial mass to hold the inertial mass in a center of the recess of the pressure receiving element and to press the inertial mass toward the piezoelectric element at a predetermined pressure so that when the sensor is subject to vertical vibrations, the inertial mass slides vertically in the recess without substantial change of voltage at the piezoelectric element, and when the sensor receives force diagonally from a front direction, a component of the force in a forward direction is received by one of the side faces of the recess and is transmitted to the piezoelectric element, and
   an adjusting bolt attached to the casing for adjusting pressure of the biasing member relative to the piezoelectric element through the inertial mass.

3. An impact sensor according to claim 2, wherein said inertial mass includes a cylindrical portion at a side opposite to the semispherical end and a recess inside the cylindrical portion, said biasing member being situated inside the recess to bias the inertial mass.

4. An impact sensor according to claim 1, further including means for receiving an output voltage from said piezoelectric element and determining whether said output voltage is greater than a predetermined level, said means providing a signal to inflate an airbag when said output voltage exceeds said predetermined level.

5. An impact sensor according to claim 1, wherein said inertial mass is formed from a magnetic material, further including an electromagnetic unit adapted to apply a magnetic force to said inertial mass to move said inertial mass away from said piezoelectric element, whereby an electric is delivered to said electromagnetic unit to move said inertial mass away from said piezoelectric element, and then, the delivery of said electric current is stopped, said piezoelectric element being operable to provide a voltage when said electric current is delivered and stopped, and said voltage being used to test the operation of said impact sensor.

* * * * *